July 2, 1963 S. G. BAUER 3,096,264
METHOD OF PRODUCING CANNED FUEL RODS FOR NUCLEAR REACTORS
Filed Dec. 7, 1959 2 Sheets-Sheet 2

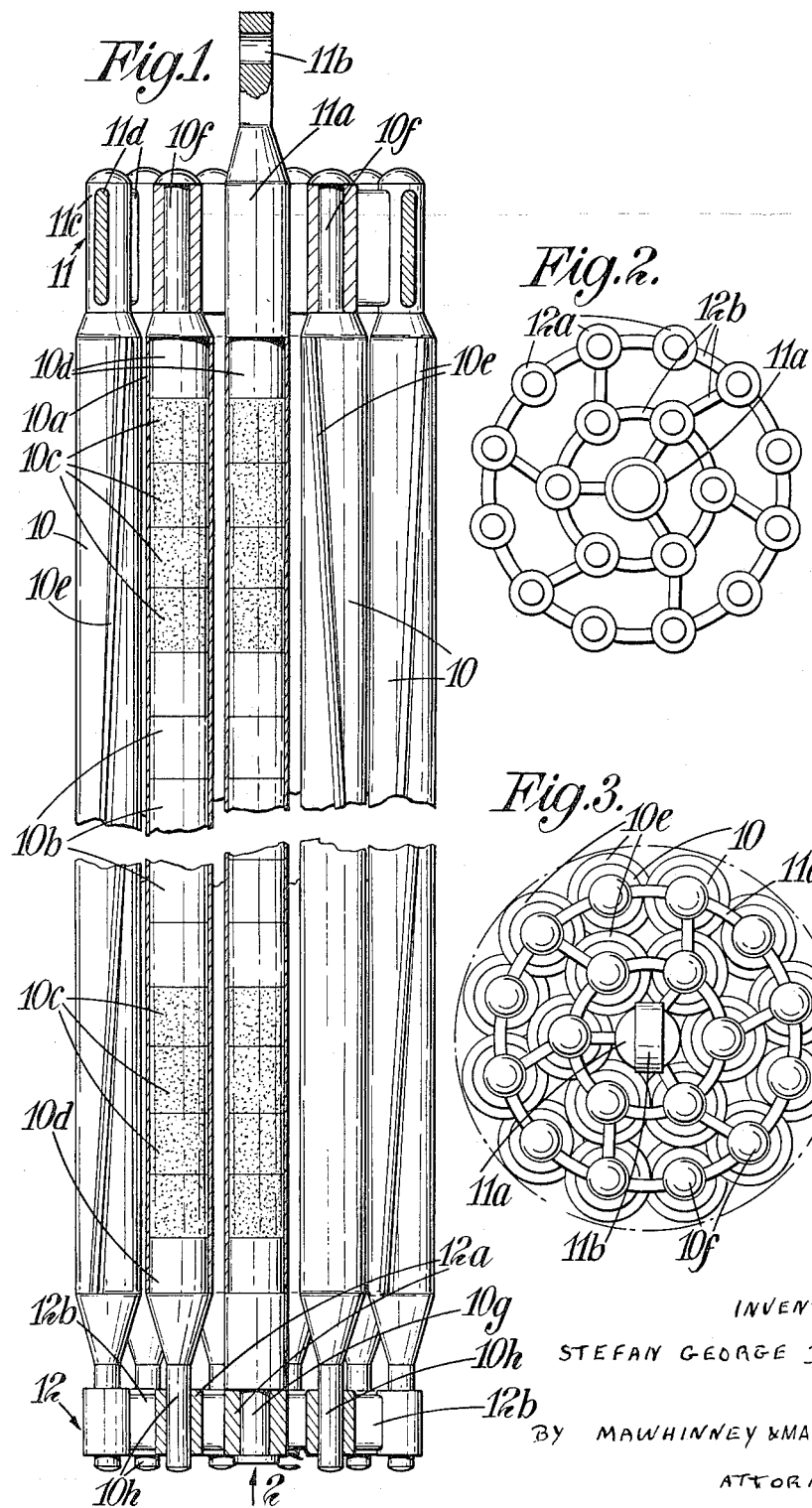

INVENTOR
STEFAN GEORGE BAUER
BY MAWHINNEY & MAWHINNEY
ATTORNEYS

United States Patent Office 3,096,264
Patented July 2, 1963

3,096,264
METHOD OF PRODUCING CANNED FUEL RODS FOR NUCLEAR REACTORS
Stefan George Bauer, Willowpit, Hilton, England, assignor to Rolls-Royce Limited, Derby, England, a company of Great Britain
Filed Dec. 7, 1959, Ser. No. 857,836
Claims priority, application Great Britain Dec. 10, 1958
4 Claims. (Cl. 204—154.2)

This invention comprises improvements in or relating to nuclear reactors and fuel rods therefor and is concerned more particularly with fuel rods of the "canned" type, that is, of the type comprising a tubular casing containing fissile material, for instance in pellet form.

Canned fuel rods are sometimes employed in bundles and a fuel rod of the canned type is known whereof the casing is a seamless drawn tube with integrally formed helical ribs which maintain the tube in spaced relation to other such tubes in a bundle.

This invention provides an improved method of producing canned fuel rods.

According to the present invention, a method of producing canned fuel rods comprises producing the fuel rod casing by the steps of bending a strip of metal into a tubular form with the longitudinal edges adjacent and outwardly flanged, twisting the tubular part about its longitudinal axis to give the flanged longitudinal edges a helical form, and welding the flanges together to form a tube having an external helical rib formed by the joined flanges. The fissile material of the fuel rod, which is conveniently in pellet form, is inserted into the tubular part either before but preferably after the twisting and welding operation.

Subsequent to the welding operation, the rib may be machined to the desired dimension and the ends of the casing may be closed by end plugs welded in position.

The method of this invention gives the advantage that the casing may be made from sheet metal permitting better metallurgical control.

This invention also includes a canned fuel rod as produced by the method of this invention.

The accompanying drawings illustrate one method in accordance with this invention by way of example and also one construction of fuel rod bundle employing canned fuel rods of this invention. In the drawings:

FIGURE 1 is an elevation of a fuel rod bundle, parts being shown in section,

FIGURE 2 is a view in the direction of arrow 2 on FIGURE 1,

FIGURE 3 is a top plan view of FIGURE 1, and

Figure 4:
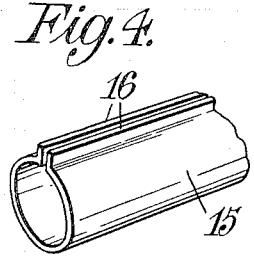
FIGURES 4 to 6 illustrate diagrammatically the method of producing fuel rods.

The fuel rod bundle illustrated in FIGURES 1 to 3 comprises 19 canned fuel rods 10 having their ends mounted in lattice-work frames 11, 12. The rods 10 are arranged in two rings about a central rod, the inner ring containing 6 equi-angularly-spaced rods and the outer ring containing 12 rods, the rods of the inner being radially aligned with alternate spaces between the rods in the outer ring (FIGURES 2 and 3).

Each fuel rod 10 comprises a casing 10a, a large number of pellets 10b of fissile material arranged end to end within the casing 10a, a number of pellets, say 4, of porous alumina 10c at each end of the pellets 10b, and a closure plug 10d of stainless steel closing each end of the casing. The casing 10a of each of the rods is formed externally with a helical rib 10e, and the rib 10e of each rod in a ring is of opposite hand to those of the adjacent rods in the ring.

The upper latticework frame 11 (FIGURES 1 and 3) is formed integrally with the plug 10d of the central rod 10, and comprises a central boss 11a having a lifting eye 11b, a series of hollow bosses 11c at positions corresponding to the rod positions and webs 11d joining the bosses 11a, 11c. The upper end plugs 10d of the rods 10 surrounding the central rod have integral extensions 10f which extend through the bosses 11c and are riveted over at their upper ends to retain the rods in position relative to the frame 11.

The lower latticework frame 12 (FIGURES 1 and 2) comprises a series of hollow bosses 12a connected together by webs 12b, one boss being in line with each rod 10. The lower end plug 10d of the central rod 10 has an extension 10g which projects through the central boss 12a and is riveted over to retain the frame 12 in position, and the remaining rods 10 have extensions 10h which slidably engage the bosses 12a aligned with them to accommodate relative expansion between the rods 10 in the rings and the central rod.

The fuel rod bundle described is suitable for use in the N.P.D. reactor described in Atomic Energy of Canada Ltd. publication A.C.E.L. 557.

Figure 5:
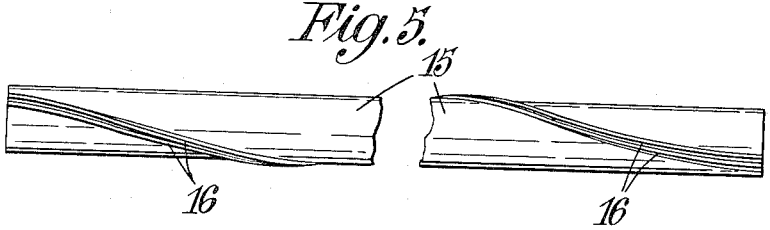
Figure 6:
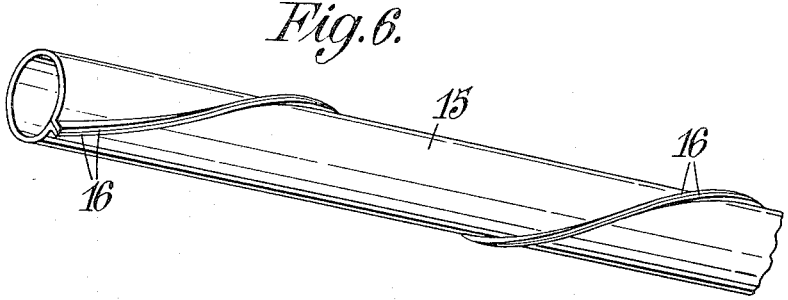

The fuel rods 10 are made in the following way. A strip of stainless steel is first bent into the form of a tube 15 with the longitudinal edges of the strip adjacent one another and turned outwardly to form a pair of flanges 16 (FIGURE 4), and the tube is then twisted about its longitudinal axis so that the flanges 16 assume a helical form (FIGURE 5). Next, the flanges 16 are secured together (FIGURE 6) by welding in an electrical seam welding machine, and the helical rib formed by the joined flanges 16 machined to the required radial dimension say 0.15 inch to give the desired spacing of the rods in a bundle. The fissile pellets 10b and the absorbent pellets 10c are then inserted into the tube and the fuel rod completed by the insertion of the stainless steel end plugs 10d which are then welded in position. The tube 15 is then tightened onto the pellets by the application of fluid pressure to its external surface.

The above method is also applicable to the manufacture of fuel rods having casings of a metal other than stainless steel for example zirconium.

In one form the rods have a length sufficient to accommodate a line of pellets 10b which is 10 feet long and the casing has an external diameter of 0.52" and is 0.01" thick. The pellets 10b are sintered pure $UO_2$ and the pellets 10c are formed from a ceramic material which is unaffected by radiation, for instance porous alumina, the pellets 10b, 10c having a diameter of about ½ inch and being about ½ inch long.

The method above set forth has the advantage that better metallurgical control and complete inspection can be maintained during manufacture.

I claim:

1. A method of producing canned fuel rods which comprises producing the fuel rod casing by the steps of bending a strip of metal into a tubular form with the longitudinal edges adjacent and outwardly flanged, twisting the tubular part about its longitudinal axis to give the flanged longitudinal edges a helical form, and welding the flanges together throughout their radial extent to form a tube having an external helical rib formed by the joined flanges, and the method further comprising the steps of inserting fissile material into the casing at least after said bending step, and after said welding step tightening the casing on the fissile material by subjecting the casing externally to fluid pressure.

2. A method of producing canned fuel rods which comprises producing the fuel rod casing by the steps of bending a strip of metal into a tubular form with the longitudinal edges adjacent and outwardly flanged, twisting the tubular part about its longitudinal axis to give the flanged longitudinal edges a helical form, then welding the helical flanges together throughout their radial extent to form a tube having an external helical rib, then inserting fissile material in pellet form into the tube, and then subjecting the tube externally to fluid pressure to tighten the tube on the pellets.

3. A method according to claim 2 comprising, after the welding step, the further step of machining the rib to a desired radial dimension.

4. A method according to claim 2 comprising the step of inserting closure plugs in the ends of the tube and welding them in position.

References Cited in the file of this patent

UNITED STATES PATENTS

| | | |
|---|---|---|
| 356,888 | Pfeiffer | Feb. 1, 1887 |
| 435,419 | Hart | Sept. 2, 1890 |
| 1,761,034 | Gillet | June 3, 1930 |
| 1,761,981 | Bundy | June 3, 1930 |
| 1,786,571 | Lonsdale | Dec. 30, 1930 |
| 2,434,519 | Raskin | Jan. 13, 1948 |
| 2,841,545 | Zinn | July 1, 1958 |
| 2,914,454 | Gurinsky et al. | Nov. 24, 1959 |
| 2,967,139 | Bartoszak | Jan. 9, 1961 |

OTHER REFERENCES

AEC Document TID-7546, March 1958, pp. 18-26, 187 (Book 1), 619 (Book 2).